(12) United States Patent
Hidaka

(10) Patent No.: US 6,875,946 B2
(45) Date of Patent: Apr. 5, 2005

(54) DEVICE FOR WELDING

(75) Inventor: Masato Hidaka, Kanagawa (JP)

(73) Assignee: Kabushiki Kaisha SMK, Kanagawa (JP)

( * ) Notice: Subject to any disclaimer, the term of this patent is extended or adjusted under 35 U.S.C. 154(b) by 0 days.

(21) Appl. No.: 10/456,916

(22) Filed: Jun. 6, 2003

(65) Prior Publication Data
US 2003/0213779 A1 Nov. 20, 2003

Related U.S. Application Data

(63) Continuation of application No. PCT/JP01/10790, filed on Dec. 10, 2001.

(30) Foreign Application Priority Data

Dec. 13, 2000 (JP) ........................................ 2000-378620

(51) Int. Cl.[7] .............................................. B23K 11/30
(52) U.S. Cl. ...................................... 219/93; 219/86.41
(58) Field of Search ............................... 219/86.41, 93, 219/119

(56) References Cited

U.S. PATENT DOCUMENTS

| | | | | |
|---|---|---|---|---|
| 4,804,913 A | * | 2/1989 | Shimizu et al. | 324/207.23 |
| 5,194,709 A | * | 3/1993 | Ichikawa et al. | 219/109 |
| 5,412,172 A | * | 5/1995 | Ichikawa et al. | 219/86.41 |
| 5,895,585 A | * | 4/1999 | Kusumegi et al. | 219/86.41 |
| 6,008,463 A | * | 12/1999 | Aoyama et al. | 219/119 |
| 6,163,004 A | * | 12/2000 | Aoyama et al. | 219/93 |
| 6,576,859 B2 | * | 6/2003 | Cabanaw | 219/119 |

FOREIGN PATENT DOCUMENTS

| | | |
|---|---|---|
| JP | 01-299782 | 12/1989 |
| JP | 04-339574 | 11/1992 |
| JP | 06-246460 | 9/1994 |
| JP | 07-009165 | 1/1995 |
| JP | 07-100660 | 4/1995 |
| JP | 10-328851 | 12/1998 |
| JP | 10-328852 | 12/1998 |

* cited by examiner

Primary Examiner—Kiley S. Stoner
Assistant Examiner—Len Tran
(74) Attorney, Agent, or Firm—Schwegman, Lundberg, Woessner & Kluth, P.A.

(57) ABSTRACT

The present invention relates to a nut positioning pin disposed on a lower electrode for the projection welding of a nut. The present invention increases cooling and positioning accuracy, prevents entrance of sputtering particles, and increases the detecting accuracy. The present invention comprises an electrode holder (2) of a double-tube structure having a cooling water passage, a guide ring (13) for guiding a coupling rod (7) for vertical movement, an air passage (m) for preventing the entrance of sputtering particles, a coupling block (28) and a magnetic shield, which comprises a magnetic member for preventing a magnetic detecting element from being affected by an external magnetic field. The present invention accurately guides cooling water and the coupling rod in the electrode holder and prevents sputtering particles from entering the electrode holder, and prevents a detector from being adversely influenced by an external magnetic field for increased detecting accuracy.

23 Claims, 8 Drawing Sheets (a)

(b)

(c)

DEVICE FOR WELDING

RELATED APPLICATIONS

This application is a continuation under 35 U.S.C. 111(a) of PCT/JP01/10790, filed on Dec. 10, 2001 and published in a language other than English on Jun. 20, 2002 as WO 02/47862 A1, which claims priority to Japanese Patent Application No.: 2000-378620, filed on Dec. 13, 2000, which applications and publications are incorporated herein by reference.

TECHNICAL FIELD

The present invention relates to a technology for preventing a welding failure or the like in the projection welding of nuts and bolts.

BACKGROUND ART

Heretofore, there is known a technology for projection-welding nuts and bolts to a steel sheet which has guide holes for the insertion of bolt shanks by setting the steel sheet on a lower electrode, lifting a positioning pin through a through hole in the lower electrode so as to project upwardly through a guide hole in the steel sheet, positioning a nut to be set on an upper surface of the steel sheet, thereafter lowering an upper electrode to press the nut against the steel sheet, and passing a current through the upper electrode and the lower electrode to weld the nut to the steel sheet. There are known techniques as disclosed in Japanese laid-open patent publications Nos. 7-9165 and 7-100660 for preventing a failure such as a reversed nut orientation or an improper nut attachment.

According to former Japanese laid-open patent publication No. 7-9165, a lower end of an actuating rod for lifting and lowering a guide pin (positioning pin) supports thereon contact pins which confront each other at a certain spaced interval, and a failure detecting circuit is formed between the actuating rod and the contact pins for detecting a nut setting failure or the like.

According to latter Japanese laid-open patent publication No. 7-100660, the position of the tip end of a detecting pin (positioning pin) which is coupled to the tip end of a coupling rod and is lifted and lowered by a cylinder is detected by a position detector for detecting a nut setting failure or the like.

In the case where the projected position of a positioning pin that can be moved into and out of the lower electrode is detected to detect a nut setting failure or the like, the device tends to be large in size due to the mounted detector, and if the actuating rod or the coupling rod which is coupled to the positioning pin is tilted when lifted or lowered, the positional accuracy is liable to suffer an error, making it difficult to detect a failure with accuracy. For example, a welding failure of a nut with a small projection, such as a hexagon nut, a round nut, a cap nut, a specially shaped weld nut, or the like cannot be detected. It is impossible to completely detect a failure of a square nut which can relatively easily be detected. Another problem is that the positioning pin tends to be worn because it is likely to frictionally engage in the through hole in the lower electrode.

If the gap between the coupling rod and a tube hole through which the coupling rod extends is reduced to prevent the coupling rod from being tilted when it is vertically moved, then when air is delivered into the tube hole for preventing sputtering particles, the air cannot flow smoothly, and fine sputtering particles are apt to enter the cylinder positioned therebelow through the tube hole. As a result, the cylinder tends to be worn and the stroke of the cylinder rod tends to be detected in error.

It is an object of the present invention to detect a projected position of a positioning pin with accuracy for thereby completely detecting a welding failure of a nut or the like and simultaneously to prevent sputtering particles produced when the nut or the like is welded from entering a lower cylinder through a tube hole of a holder, and also to make a welding device compact.

DISCLOSURE OF THE INVENTION

To achieve the above object, there is provided in accordance with the present invention an device for welding a nut or the like, comprising an electrode holder of a double-tube structure having an inner tube and an outer tube which are fitted together with a cooling water passage defined in a gap therebetween, a lower electrode coupled to an upper end of the electrode holder and having a through hole defined centrally therein, an air cylinder coupled to a lower end of the electrode holder, a coupling rod disposed in the tubes of the electrode holder and vertically movable when the air cylinder is operated, a positioning pin disposed on an upper portion of the coupling rod and having a tip end movable into and out of the through hole in the lower electrode when the coupling rod is vertically moved, and an air blowing mechanism for delivering air into the inner tube from a lower portion of the electrode holder, characterized in that a detector for detecting a projected position of the positioning pin is mounted on the air cylinder, a guide ring for guiding the coupling rod for vertical movement is disposed on an upper portion of the inner tube of the electrode holder, and air passage means for passing air delivered from the air blowing mechanism upwardly is defined in the coupling rod.

Because the guide ring is provided in the inner tube for guiding the coupling rod for vertical movement. Therefore, the coupling rod is prevented from being tilted when it is vertically moved, allowing the positioning pin to be detected with accuracy. Since the air passage means is provided in the coupling rod, air can flow smoothly for effectively preventing sputtering particles from entering into the electrode holder.

The air passage means may comprise a beveled surface on an outer surface of the coupling rod, a groove defined in the outer surface of the coupling rod, or a hollow space in the coupling rod. If the air passage means comprises a beveled surface on an outer surface of the coupling rod, then at least one beveled surface is formed axially, and the outer surface of the coupling rod other than the beveled surface is held in close contact with the guide ring for inhibiting the coupling rod from being tilted.

By detecting the projected position of the positioning pin prior to and subsequent to welding with the detector, a nut setting failure, a nut welding failure, or the like is detected. A welding failure is prevented from occurring by controlling a detecting signal with a controller.

The detector may comprise a mechanical sensor, an optical sensor, a magnetic sensor, or the like for detecting, for example, the stroke of the cylinder rod, the coupling rod, or the like.

The electrode holder having the double-tube structure made up of the inner tube and the outer tube with the cooling water passage defined in the gap therebetween may be based on the technology disclosed in Japanese laid-open patent publication 11-197849 proposed by the present applicant. Use of the cooling circuit makes it possible to render the device compact.

According to the present invention, there is provided another device for welding a nut or the like, comprising a tubular electrode holder, a lower electrode coupled to an upper end of the electrode holder and having a through hole defined centrally therein, an air cylinder coupled to a lower end of the electrode holder by a coupling block, a coupling rod disposed in a tube of the electrode holder and vertically movable when the air cylinder is operated, a positioning pin disposed on an upper portion of the coupling rod and having a tip end movable into and out of the through hole in the lower electrode when the coupling rod is vertically moved, and an air blowing mechanism for delivering air into an upper portion of the tube from a lower portion of the electrode holder, characterized in that the coupling block comprises a magnetic member, an insulation is provided between the electrode holder and the air cylinder, the air cylinder has a cylinder rod with magnetic graduations, and the air cylinder has a magnetic detecting element for detecting the magnetic graduations and an amplifier for amplifying a signal from the magnetic detecting element.

A nut welding failure is detected by detecting the stroke of the cylinder rod. Specifically, if a magnetoresistance sensor for detecting the magnetic graduations on the cylinder rod with the magnetic detecting element disposed on the air cylinder, and amplifying and processing a signal from the magnetic detecting element with the amplifier is applied, then the stroke of the cylinder rod can be detected highly accurately, thus substantially fully detecting a nut failure or the like. However, a malfunction tends to occur due to the action of an external magnetic field such as a magnetic field produced by a current which flows to weld the nut or the like.

Adverse influences of the external magnetic field on the air cylinder are eliminated by coupling the electrode holder and the air cylinder to each other with the coupling block which comprises a magnetic member. By directly coupling the electrode holder and the air cylinder to each other with the coupling block, the overall device is made compact. The air cylinder, the cylinder rod, etc. are prevented from being electrolytically corroded by electrically insulating the electrode holder and the air cylinder from each other.

The magnetic detecting element should preferably comprise a magnetoresistance device or the like for measuring a resistance which varies with magnetic forces. The magnetic graduations on the cylinder rod may be in the form of magnetic graduations formed, for example, at predetermined pitch intervals on the cylinder rod which is made of a nonmagnetic material, or grooves, functioning as a nonmagnetic material, defined at equal spaced intervals in the cylinder rod which is made of a magnetic material. By making the magnetic graduations finer, for example, the stroke can be detected at a smaller resolution of about 0.01 mm.

The coupling block which comprises a magnetic member may be made of permalloy having a high relative magnetic permeability with respect to air, grain-oriented silicon steel, or another ferromagnetic material.

According to the present invention, there is provided still another device for welding a nut or the like, comprising a tubular electrode holder, a lower electrode coupled to an upper end of the electrode holder and having a through hole defined centrally therein, an air cylinder coupled to a lower end of the electrode holder by a coupling shaft, a coupling rod disposed in a tube of the electrode holder and vertically movable when the air cylinder is operated, a positioning pin disposed on an upper portion of the coupling rod and having a tip end movable into and out of the through hole in the lower electrode when the coupling rod is vertically moved, and an air blowing mechanism for delivering air into an upper portion of the tube from a lower portion of the electrode holder, characterized in that an insulation is provided between the electrode holder and the air cylinder, the air cylinder has a cylinder rod with magnetic graduations, and the air cylinder has a magnetic detecting element for detecting the magnetic graduations and an amplifier for amplifying a signal from the magnetic detecting element.

By coupling the electrode holder and the air cylinder to each other with the coupling shaft to keep an increased distance between the electrode holder and the air cylinder, adverse influences of an external magnetic field are less likely to be posed on the magnetic graduations the magnetic detecting element, and the amplifier disposed on the air cylinder.

In this case, the device becomes somewhat larger than that using the coupling block. However, using the coupling shaft is favorable since the adverse influences of the external magnetic filed can be easily avoided by adjusting the length of the coupling shaft.

Another device for welding a nut or the like according to the present invention is characterized in that the cylinder rod with the magnetic graduations, the magnetic detecting element, and the amplifier are covered with and magnetically shielded by a magnetic member.

By thus covering and magnetically shielding the magnetic graduations, the magnetic detecting element, and the amplifier with the magnetic member, the magnetic detecting element and the amplifier are prevented from malfunctioning due to an external magnetic field.

The magnetic member should preferably be made of permalloy having a high relative permeability with respect to air, grain-oriented silicon steel, or another ferromagnetic material.

Another device for welding a nut or the like according the present invention is characterized in that the magnetic member and the coupling block, or the coupling shaft is disposed such that the magnetic flux density in the vicinity of the magnetic graduations on the cylinder rod, the magnetic detecting element, and the amplifier is suppressed to 500 gausses or less.

If the magnetic flux density in the vicinity of the magnetic graduations, the magnetic detecting element, and the amplifier is suppressed to 500 gausses or less primarily by the materials and thicknesses of the coupling block and the magnetic member when the coupling block is used, and primarily by the length of the coupling shaft when the coupling shaft is used, then the stroke of the cylinder rod is detected more accurately for detecting a nut failure or the like with accuracy.

Another device for welding a nut or the like according to the present invention is characterized in that the coupling rod is coupled to the tip end of the cylinder rod of the air cylinder by an insulating member.

With the air cylinder and the cylinder rod are electrically insulated from each other, for example, the cylinder rod, etc. is prevented from being electrolytically corroded for increased durability.

Another device for welding a nut or the like according to the present invention is characterized in that entrance of foreign material preventing means for preventing the entrance of foreign matter, a liquid, etc. from outside the device is disposed around the cylinder rod with the magnetic graduations formed thereon, the magnetic detecting element, and the amplifier.

Since the entrance of foreign material preventing means prevents foreign matter, a liquid, etc. from entering around the cylinder rod with the magnetic graduations, the magnetic detecting element, and the amplifier, the accuracy with which to detect the stroke with the magnetic sensor is not impaired, and a reduction in the durability of these components due to the entrance of foreign matter, a liquid, etc. is prevented.

The entrance of foreign material preventing means should preferably be in the form of the magnetic member for providing a magnetic shield against entrance from around the magnetic graduations, the magnetic detecting element, and the amplifier, and in the form of a seal member such as an O-ring against entrance from the gap around the cylinder rod.

Another device for welding a nut or the like according to the present invention is characterized in that an in-block air blowing mechanism is provided in the coupling block for removing foreign matter, a liquid, etc. which have entered into the coupling block, with an air blow.

Specifically, when foreign matter, a liquid, etc. enter the coupling block, the sliding region of the cylinder rod tends to be worn easily and the magnetic detecting element tends to malfunction. The foreign matter, a liquid, etc. which have entered the coupling block are removed by an air blow from the air blowing mechanism.

Another device for welding a nut or the like according to the present invention is characterized in that a pin coupling having a variable coupling structure is disposed on an upper end of the coupling rod for coupling different positioning pins of different coupling types.

With the pin coupling of the variable coupling structure being disposed on the upper end of the coupling rod, a positioning pin that is made of ceramics which are highly durable, but make it impossible for the positioning pin to be threaded, and a positioning pin that is made of a metal which makes it possible for the positioning pin to be threaded, and is inexpensive, can freely be coupled to the coupling rod. Therefore, there is available an increased choice of positioning pins.

BEST MODE FOR CARRYING OUT THE INVENTION

The present invention will hereinafter be described in detail below with reference to the drawings.

Figure 1:
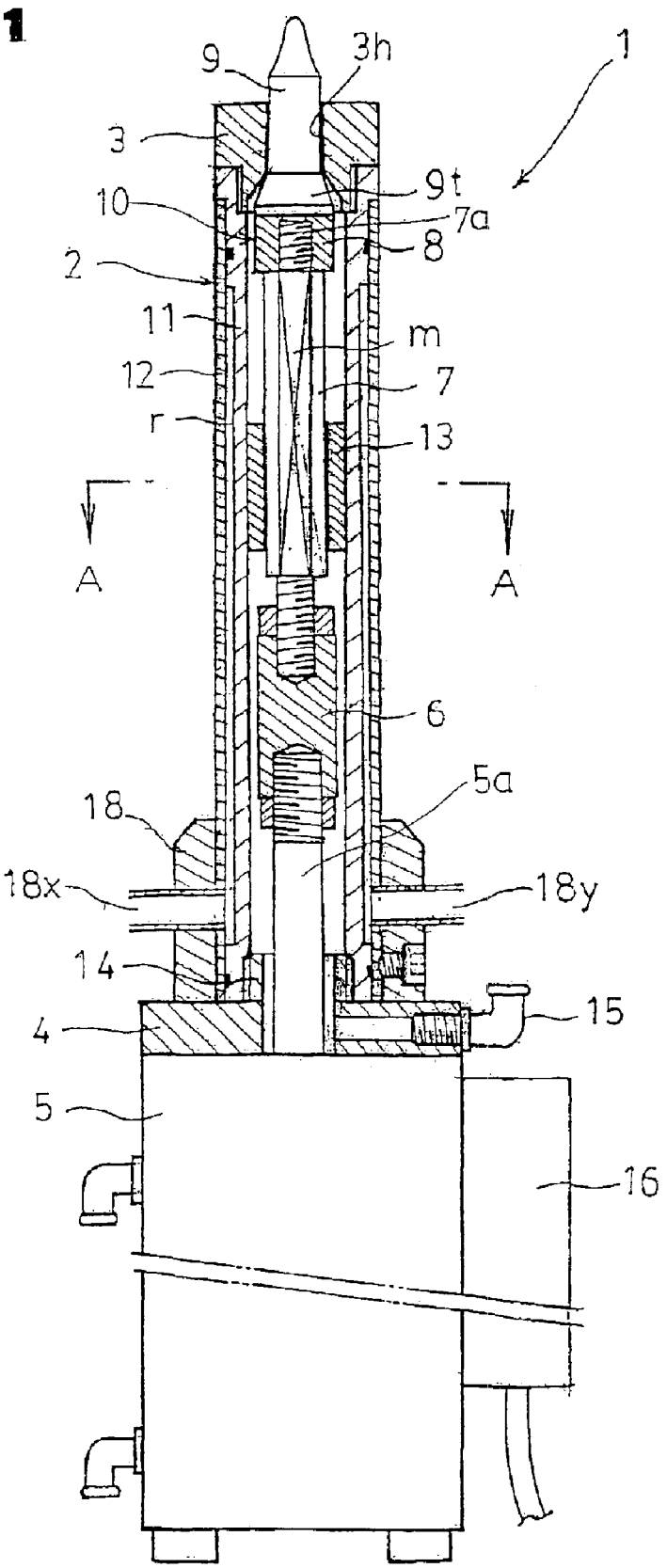
FIG. 1 is a vertical cross-sectional view of an device for welding a nut or the like according to a first embodiment of the present invention.

An device 1 for welding a nut or the like according to the present invention is capable of detecting the projected position of a positioning pin with accuracy and of preventing sputtering particles produced upon welding from entering a tube of a holder for increased durability. As shown in FIG. 1, the device 1 has a double-tube electrode holder 2, a lower electrode 3 coupled to an upper portion of the electrode holder 2, and an air cylinder 5 coupled to a lower portion of the electrode holder 2 with an insulating member 4 interposed therebetween. The air cylinder 5 has a cylinder rod 5a coupled to a coupling rod 7 by an insulating member 6. A pin coupling 10 is mounted on an upper portion of the coupling rod 7, and a positioning pin 9 made of ceramics is mounted on the pin coupling 10 by a nut seat 8.

The lower electrode 3 has a through hole 3h defined centrally therein and having in a lower end thereof a tapered opening complementary to a tapered portion 9t of the positioning pin 9. The tapered portion 9t of the positioning pin 9 has its larger-diameter end directed downwardly and placed on the nut seat 8, after which an externally threaded portion of the lower electrode 3 is threaded over an internally threaded portion of the electrode holder 2, thereby mounting the positioning pin 9 against removal.

When the air cylinder 5 is actuated to lift the cylinder rod 5a, the positioning pin 9 is lifted by the coupling rod 7 until the tip end of the positioning pin 9 projects upwardly from the through hole 3h in the lower electrode 3. When the cylinder rod 5a is lowered, the positioning pin 9 is lowered by gravity back into the through hole 3h.

Figure 2:
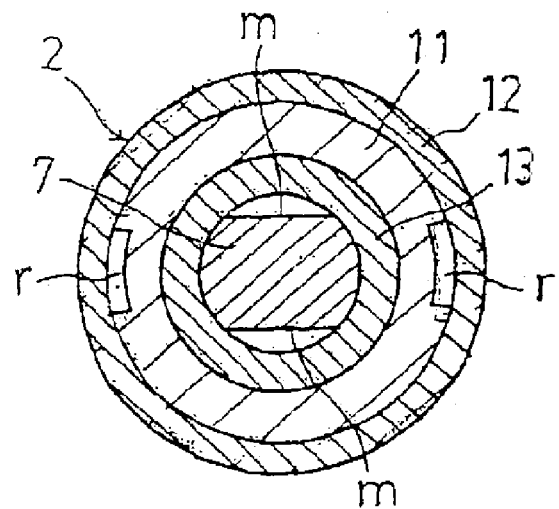
FIG. 2 is a cross-sectional view taken along line A—A of FIG. 1.

As shown in FIG. 2, the electrode holder 2 has an inner tube 11 having grooves defined in an outer surface thereof and an outer tube 12 fitted over the inner tube 11 in a water-tight manner, providing cooling water passages r (the grooves in the inner tube 11) between the interfitting tubes 11, 12. As shown in FIG. 1, the cooling water passages r are held in communication with a water inlet 18x and a water outlet 18y which are defined in a water guide ring 18 that is fitted over the lower end of the outer tube 12.

The lower electrode 3 is cooled by cooling water circulated in the cooling water passages r in the electrode holder 2.

A guide ring 13 made of Teflon (a registered trademark of DuPont) is mounted in the inner tube 11 of the electrode holder 2 for guiding the coupling rod 7 to move vertically without being tilted.

The coupling rod 7 is coupled to the cylinder rod 5a by the insulating member 6 which electrically insulate the coupling rod 7 and the cylinder rod 5a from each other. As also shown in FIG. 2, the coupling rod 7 comprises a round rod of a circular cross section having flat beveled surfaces m defined axially on its opposite sides as an air passage means.

The beveled surfaces m provide an air passage for air which is delivered into the tubes by an air blowing mechanism to be described later on.

The diameter of the portion of the coupling rod 7 which is free of the beveled surfaces m is slightly smaller than the inside diameter of the guide ring 13. If the clearance between that portion of the coupling rod 7 and the guide ring 13 is of a small dimension ranging from $1/100$ to $5/10$ mm, then the coupling rod 7 can smoothly be slide in the guide ring 13 while being limited in tilting movement.

Figure 3:
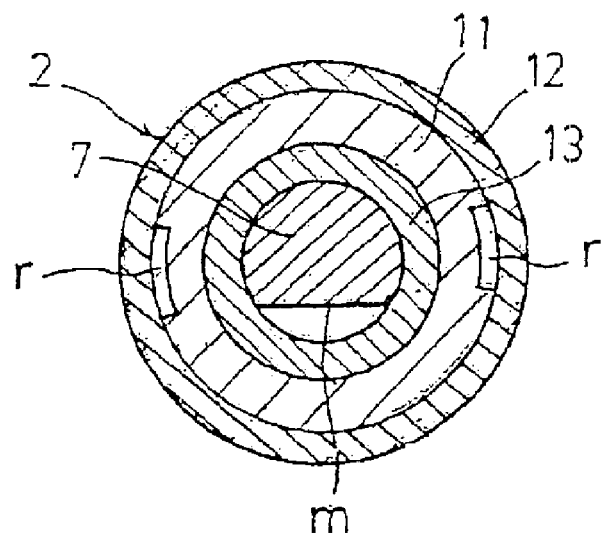
FIG. 3 is a view showing a coupling rod of another structure.

In the embodiment shown in FIG. 2, a pair of beveled surfaces m is formed on the opposite sides of the coupling rod 7. However, as shown in FIG. 3, at least one beveled surface may be formed on the coupling rod 7 for limiting tilting movement of the coupling rod 7.

The air passage means may comprise a groove defined in the outer surface of the coupling rod 7, rather than the beveled surfaces m, or alternatively a hollow space defined as an air passage in the coupling rod.

The pin coupling 10 on the upper end of the coupling rod 7 has a variable coupling structure for the positioning pin 9. In the embodiment shown in FIG. 2, the pin coupling 10 comprises an externally threaded portion 7a on the upper end of the coupling rod 7 and the nut seat 8.

Figure 4:
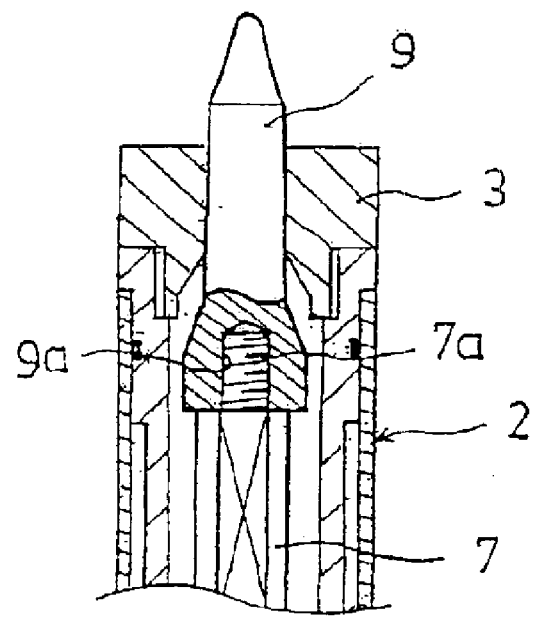
FIG. 4 is a view showing an example in which a positioning pin of another form is coupled to a pin coupling on the tip end of the coupling rod.
Figure 5:
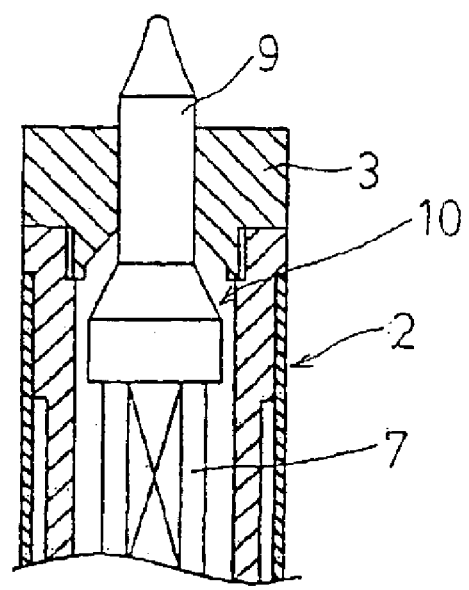
FIG. 5 is a view showing another structure in which a positioning pin is placed on the tip end of the coupling rod.

According to the present embodiment, since the positioning pin 9 is made of ceramics which make it impossible for the positioning pin 9 to have an internally threaded portion, the nut seat 8 is threaded over the externally threaded portion 7a of the coupling rod 7, the positioning pin 9 is placed on the nut seat 8, and the lower electrode 3 is placed over the positioning pin 9 to hold the positioning pin 9 mounted against removal. However, if the positioning pin 9 is made of a metal which makes it possible for the positioning pin 9 to have an internally threaded portion, then, as shown in FIG. 4, the nut seat 8 may be eliminated, and an internally threaded portion 9a of the positioning pin 9 may directly be threaded over the externally threaded portion 7a of the coupling rod 7. Alternatively, as shown in FIG. 5, the externally threaded portion 7a of the coupling rod 7 may be eliminated, and the positioning pin 9 may directly be placed on the upper portion of the coupling rod 7.

If the positioning pin 9 is directly coupled as shown in FIG. 4, then the positioning pin 9 may be lifted and lowered directly when the cylinder rod 5a is vertically moved. If the positioning pin 9 is made of a metal, then its surface should preferably electrically insulated by an insulating paint or the like.

The insulating member 4 on the upper end of the air cylinder 5 is fastened in position to the air cylinder 5 by screws or the like for electrically insulating the electric holder 2 and the air cylinder 5 from each other. A screw 14 through which the cylinder rod 5a extends is fixed to an upper central surface of the insulating member 4, and an internally threaded portion of the lower end of the electrode holder 2 is threaded over the screw 14.

The device is made compact by directly joining the electrode holder 2 and the air cylinder 5 to each other with the insulating member 4 interposed therebetween.

The insulating member 4 has a blowing air supply port 15 as an air blowing mechanism for delivering air into the tubes through the lower end of the electrode holder 2.

When air is blown upwardly in the tubes of the electrode holder 2, sputtering particles that are produced upon welding are prevented from entering the air cylinder 5 via the electrode holder 2. The air is smoothly passed upwardly along the beveled surfaces m of the coupling rod 7.

Figure 6:
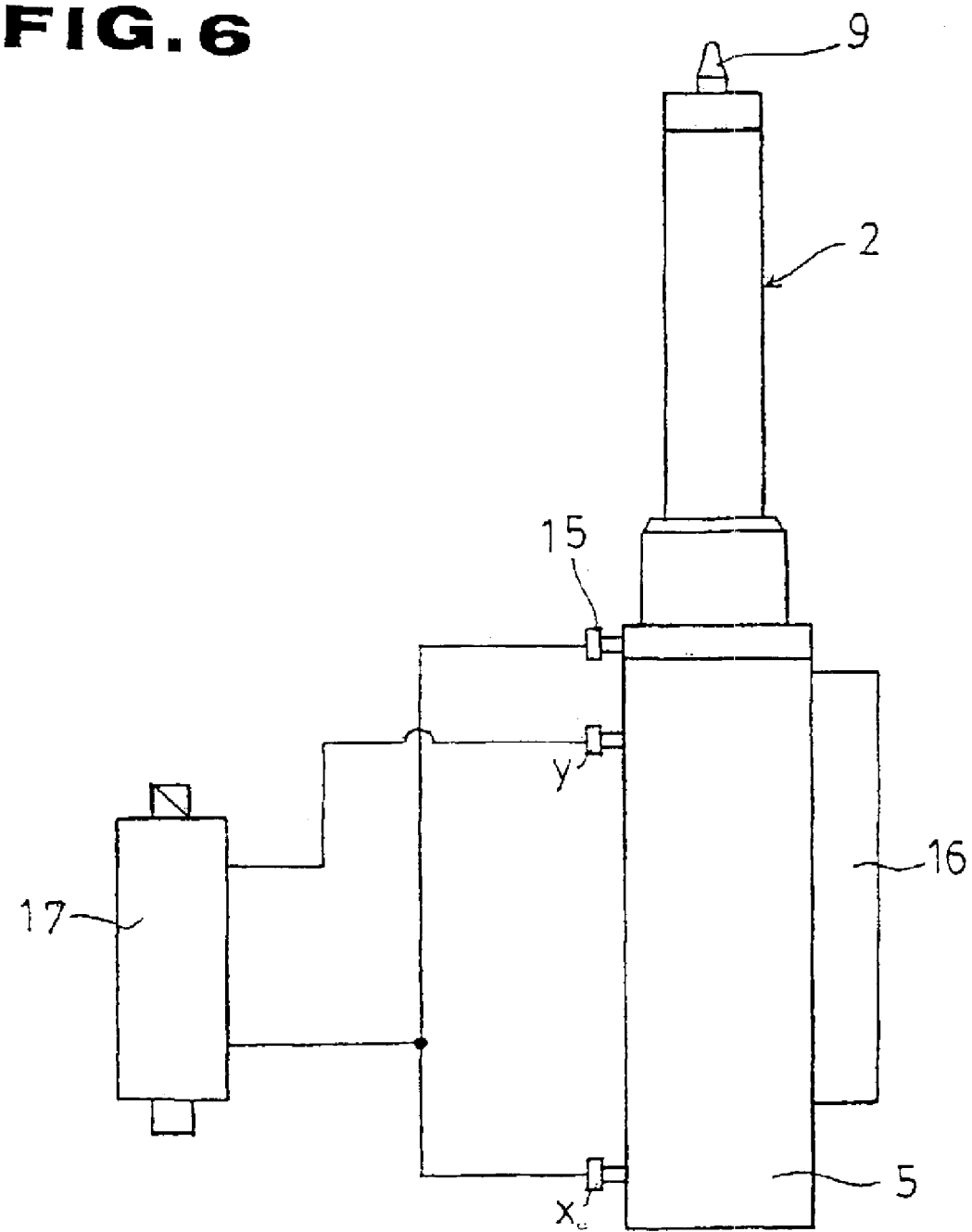
FIG. 6 is a diagram showing an air supply circuit.

As shown in FIG. 6, the air supply circuit comprises a four-way valve 17 connected to a rod-extending air supply port x of the air cylinder 5, the blowing air supply port 15, and a rod-retracting air supply port y of the air cylinder 5. If the positioning pin 5 is made of ceramics, then air is blown when the cylinder rod 5a is extended, and air blown from the blowing air supply port 15 is stopped when the cylinder rod 5a is retracted.

It is possible to blow air from the blowing air supply port 15 at all times. In this case, however, the positioning pin 9 is not lowered even when the cylinder rod 5a is retracted.

If the positioning pin 9 has the threaded hole as shown in FIG. 4, since the positioning pin 9 is lowered when the cylinder rod 5a is retracted, no problem arises when air is blown at all times.

A detector 16 for detecting the position of the cylinder rod 5a (the position of the positioning pin 9) is mounted on a side of the air cylinder 5. The detector 16 is connected to a counter, not shown, and a nut setting failure, a nut welding failure, or the like is detected based on a preset value set in the counter for controlling the welding process.

The detector may be of any type, such as a magnetic sensor, an optical sensor, or any other sensor insofar as it can detect the extended stroke of the cylinder rod.

A projection welding process using the device 1 described above will be described below with reference to FIGS. 9(a) through 9(c).

First, a sheet-like workpiece W such as a steel sheet or the like having a guide hole for the insertion of a bolt shank is set on the upper end of the lower electrode 3. After a nut N is placed on the sheet-like workpiece W in alignment with the guide hole, the air cylinder 5 is extended to lift the positioning pin 9 by a maximum stroke, as shown in FIG. 9(a).

At this time, the position of the tip end of the positioning pin 9 is detected by the detector 16. For the purpose of facilitating the explanation of the subsequent position of the positioning pin 9, the distance between the upper surface of the nut N and the upper surface of the sheet-like workpiece W is indicated by $L_1$.

Figure 9:
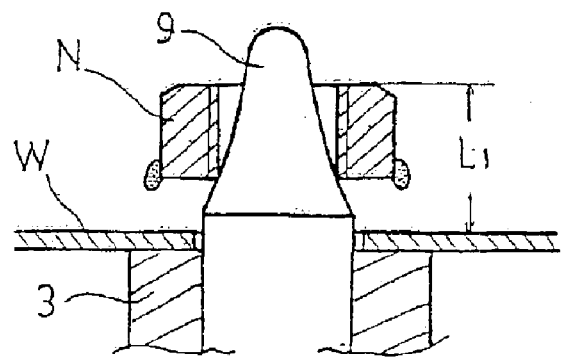
FIGS. 9(a) through 9(c) are views illustrative of a process of detecting the position of a positioning pin upon welding.
Figure 9:
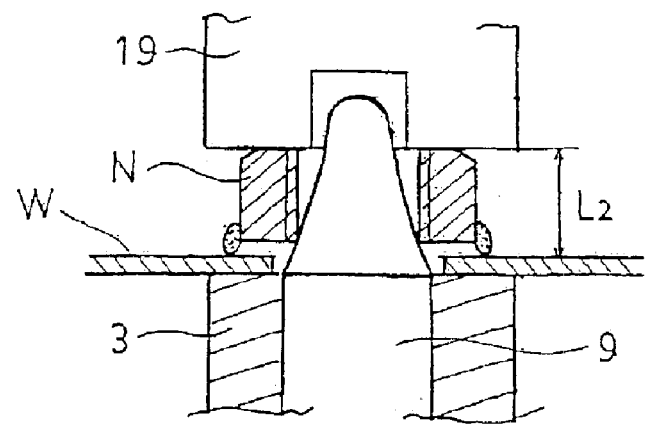
Figure 9:
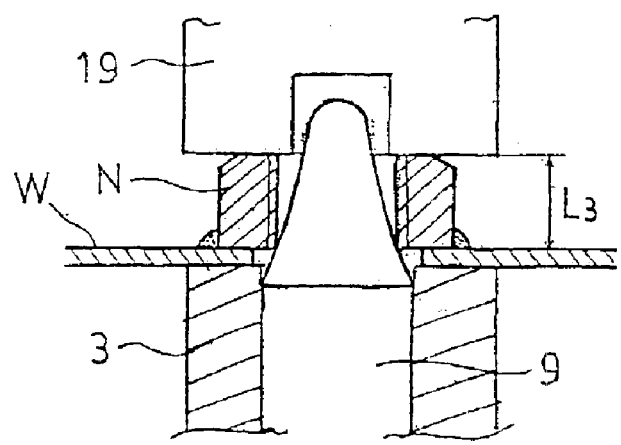

Then, as shown in FIG. 9(b), the upper electrode 19 is lowered to press the nut N against the sheet-like workpiece W, and the position of the tip end of the positioning pin 9 at this time is detected by the detector 16. Since the positioning pin 9 is pressed and lowered by the nut N, the distance that the nut N is lowered and the distance that the positioning pin 9 is lowered are equal to each other. Therefore, if the distance between the upper surface of the nut N and the upper surface of the sheet-like workpiece W is indicated by $L_2$ at this time, then the difference $L_1-L_2$ is the same as the distance that the positioning pin 9 is lowered. If the value of the difference $L_1-L_2$ falls in the range of the preset value set in the counter, then the nut N is judged as being normal and having a normal attitude, and the welding process is continued. If the value of the difference $L_1-L_2$ falls out of the range of the preset value, then the nut N is judged as being not normal, and the welding process is interrupted.

If the state prior to welding is judged as being normal, then an electric current is passed through the nut N to weld the nut N while the nut N is being pressed by the upper electrode 19. As shown in FIG. 9(c), protrusions of the nut N are melted, allowing the nut N and the positioning pin 9 to be lowered. At this time, the position of the tip end of the positioning pin 9 is detected by the detector 16.

If the distance between the upper surface of the nut N and the upper surface of the sheet-like workpiece W is indicated by $L_3$ at this time, then the welding process is judged as being normal when the difference $L_1-L_3$ falls in the range of the preset value set in the counter, and judged as being not normal when the difference $L_1-L_3$ falls out of the range of the preset value set in the counter, and the defective product is removed from the line.

Failures prior to welding and subsequent to welding can thus be detected according to the above process. Failures can be recognized and prevented with high accuracy by setting a highly accurate preset value in the counter and detecting positions highly accurately with the detector 16.

When the positioning pin is lifted for the first time, air is delivered from the blowing air supply port 15 across the beveled surfaces m of the coupling rod 7 upwardly of the guide ring 13. As shown in FIG. 9(b), when the upper electrode 19 is lowered to press the nut N against the sheet-like workpiece W, the positioning pin 9 is lowered by the nut N, producing a gap between the tapered portion 9t of the positioning pin 9 and the surface defining the through hole 3h in the lower electrode 3. The air is now blown upwardly through the gap. Therefore, sputtering particles produced upon welding do not enter into the air cylinder 5 through the tubes of the electrode holder 2, so that the air cylinder 5 is effectively prevented from being damaged.

The coupling rod 7 and the cylinder rod 5a are electrically insulated from each other by the insulating member 6, and the electrode holder 2 and the air cylinder 5 are electrically insulated from each other by the insulating member 4. Therefore, the cylinder rod 5a is prevented from being damaged by electrolytic corrosion, and has increased durability.

Furthermore, inasmuch as the pin coupling 10 capable of allowing positioning pins 9 of different coupling types to be mounted is mounted on the upper end of the coupling rod 7, an increased choice is available of different positioning pins 9.

If the detector comprises a magnetoresistance sensor based on the magnetoresistance effect, then the stroke of the positioning pin can be detected with greater accuracy. In this case, since the detecting element may possibly malfunction under a magnetic field generated by a welding current, the air cylinder 5 should preferably be positioned remotely from the energizing unit or the detecting element should preferably be enclosed by a magnetic shield member for preventing itself from malfunctioning.

Figure 7:
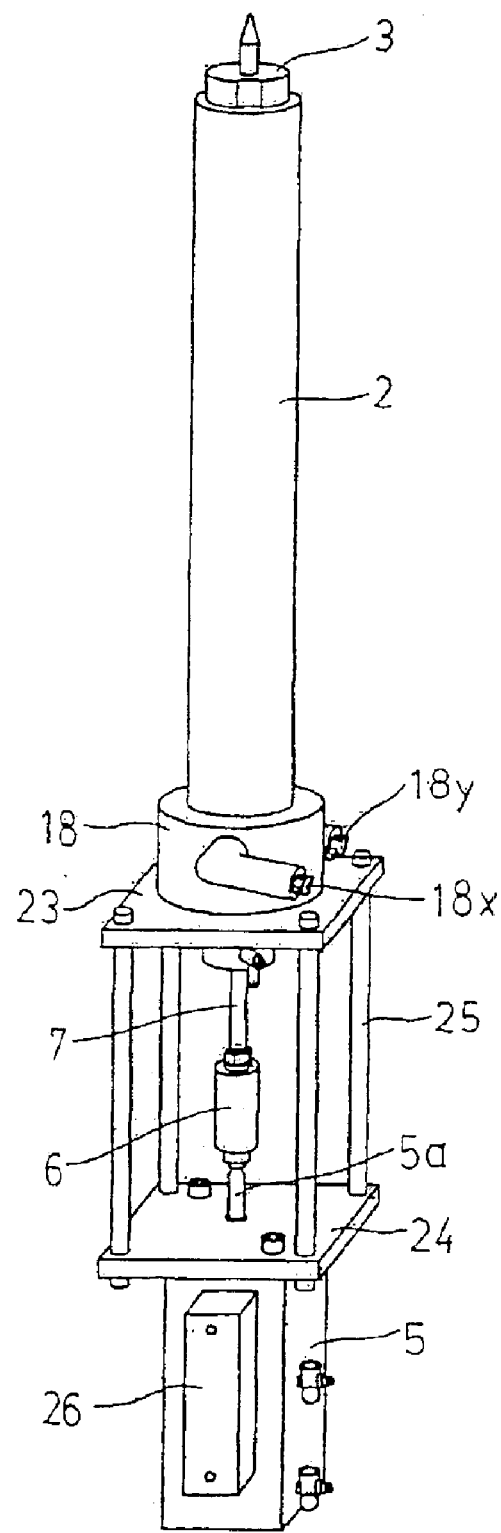
FIG. 7 is a perspective view of an device for welding a nut or the like according to a second embodiment of the present invention.

FIG. 7 shows an example in which the detector comprises a magnetoresistance sensor and the air cylinder 5 is positioned remotely from the electrode holder 2. According to this example, a first support plate 23 on which the water guide ring 18 is mounted and a second support plate 24 made of an insulating material on which the air cylinder 5 is mounted are interconnected by a plurality of joint shafts 25, which keep the electrode holder 2 and the air cylinder 5 spaced a certain distance from each other, so that the detector will not be adversely influenced by a magnetic field from the energizing unit, not shown, connected to the electrode holder 2.

Rather than the second support plate 24 being made of an insulating material, the joint shafts 25 may be made of an insulating material. Alternatively, a laminated layer of an insulating material may be placed between the second support plate 24 and the air cylinder 5.

The detector used in this arrangement comprises magnetic graduations formed on the cylinder rod 5a, a magnetic detecting element primarily in the form of a magnetoresistance element, and an amplifier 26 for amplifying a signal detected by the magnetic detecting element. The amplifier 26 is mounted on an outer surface of the air cylinder 5, and the magnetic graduations are in the form of magnetic layers disposed at predetermined spaced intervals on the cylinder rod which is made of SUS404 or a nonmagnetic material such as a nonferrous material. The magnetic detecting element is housed in the air cylinder 5 near the cylinder rod. After a movement of the cylinder rod is detected by the magnetic detecting element as represented by two-phase signals, i.e., sine and cosine signals, these signals are amplified by the amplifier 26 and numerically divided into pulse signals, which are outputted. In the present embodiment, the magnetic flux density in the vicinity of the magnetic graduations, the magnetic detecting element, and the amplifier is suppressed to 500 gausses or less to enable the detector to detect the stroke of the cylinder rod with a fine resolution.

In the embodiment shown in FIG. 7, the length of the coupling shaft 7 is selected such that the magnetic flux density in the vicinity of the cylinder rod 5a on which the magnetic graduations are formed, the magnetic detecting element, and the amplifier 26 is suppressed to 500 gausses or less to prevent the magnetic sensor from malfunctioning under the magnetic field external thereto. The resolution at which the stroke is detected is about 0.01±0.02 mm. It has been confirmed that the magnetic sensor is completely prevented from malfunctioning if the magnetic flux density is reduced to 145 gausses or less.

The electrode holder 2 may be of a double-tube structure as shown in FIG. 1, or may be of a single-tube structure.

The cylinder rod 5a may be made of a magnetic material rather than a nonmagnetic material, and may have grooves, functioning as a nonmagnetic material, defined therein at equal spaced intervals.

Figure 8:
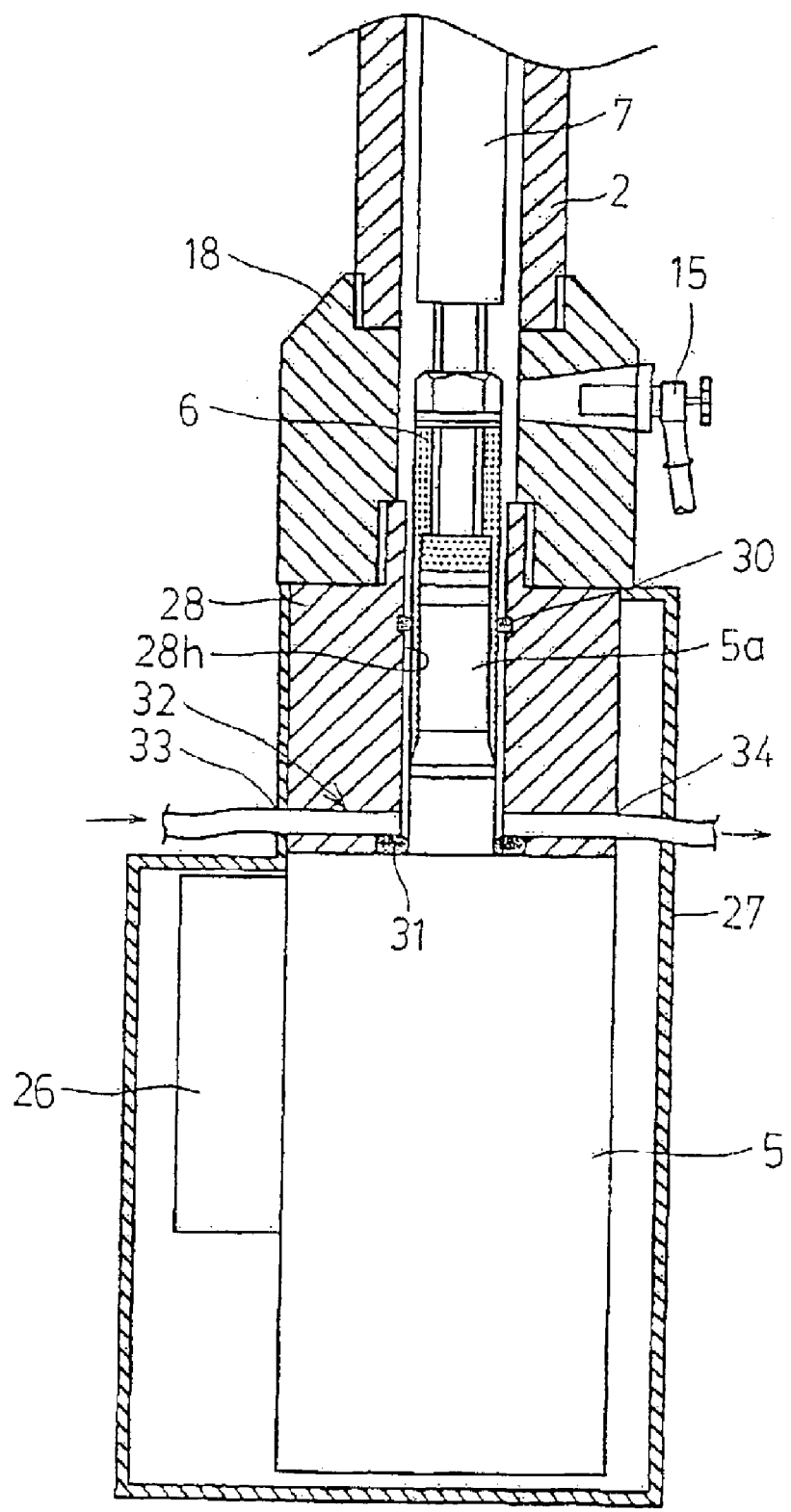
FIG. 8 is a fragmentary vertical cross-sectional view of an device for welding a nut or the like according to a third embodiment of the present invention.

FIG. 8 shows an example in which a magnetoresistance sensor identical to the magnetoresistance sensor in the previous example is employed, and a coupling block 28 which is of a magnetic material and is insulative is interposed between the water guide ring 18 and the air cylinder 5 such that when the cylinder rod 5a with magnetic graduations is extended, it is covered with a magnetic shield material. The cylinder rod 5a with magnetic graduations, the magnetic detecting element, and the amplifier 26 are covered with a magnetic member 27 made of a ferromagnetic material to shield themselves from an external magnetic field. The magnetic member 27 doubles as part of a entrance of foreign material preventing means for preventing foreign matter, a liquid, etc. from entering the cylinder rod 5a, the magnetic detecting element, and the amplifier 26.

In this embodiment, the magnetic detecting element is disposed in the vicinity of the cylinder rod 5a in the air cylinder 5, and the amplifier 26 is disposed outside of the air cylinder 5.

In the present embodiment, the coupling block 28 comprises a magnetic member made of a ferromagnetic material having an insulated surface. The coupling block 28 and the magnetic member 27 provide a magnetic shield effect for reducing the magnetic flux density around the cylinder rod 5a with the magnetic graduations, the magnetic detecting element, and the amplifier 26 to 500 gausses or less. In this case, the magnetic detecting element is fully prevented from malfunctioning if the magnetic flux density is reduced to 145 gausses or less.

The coupling block 28 may comprise a block in the form of a magnetic member made of a ferromagnetic material with a laminated layer of an insulating material.

The electrode holder 2 may be of a double-tube structure as shown in FIG. 1, or may be of a single-tube structure.

In this example, the water guide ring 18 has the blowing air supply port 15 and allows air delivered from the blowing air supply port 15 to flow upwardly.

A seal member 30 capable of sealing the gap between an inner hole 28h in the coupling block 28 and the cylinder rod 5a is disposed in an upper portion of the inner hole 28h as other part of the entrance of foreign material preventing means. The seal member 30 is effective to prevent foreign matter, a liquid, etc. from entering around the cylinder rod 5a and into the magnetic detecting element, and also to cause all of the air delivered from the blowing air supply port 15 to flow upwardly.

A seal member 31 capable of sealing the gap between the inner hole 28h in the coupling block 28 and the cylinder rod 5a is disposed in a lower portion of the inner hole 28h. The seal member 31 is effective to prevent foreign matter, a liquid, etc. from entering into the air cylinder 5.

The coupling block 28 incorporates therein an in-block air blowing mechanism 32 for removing foreign matter, a liquid, etc. which have entered into the inner hole 28h.

The in-block air blowing mechanism 32 is disposed independently of the air blowing mechanism (the blowing air supply port 15) for removing foreign matter, etc. in the tubes of the electrode holder 2. The inblock air blowing mechanism 32 comprises an air blow supply port 33 for introducing air into the inner hole 28h and an air discharge port 34 for discharging the introduced air. Foreign matter such as sputtering particles, and liquids such as cooling water, oil, etc. which have entered into the inner hole 28h are discharged from the air discharge port 34 to prevent the magnetic graduations on the cylinder rod 5a, the detecting element, etc. from being adversely influenced by those foreign matter and liquids and also to prevent the air cylinder from being worn.

Figure 10:
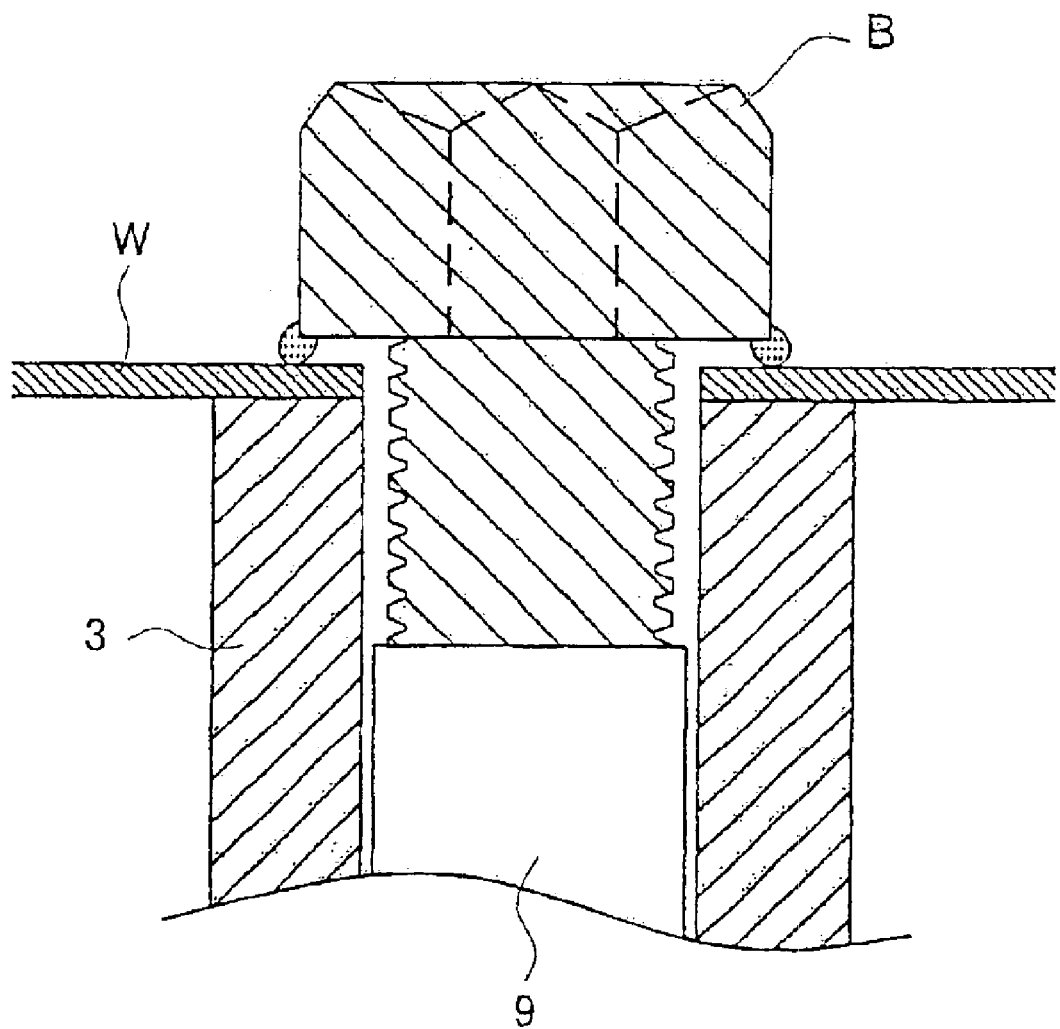
FIG. 10 is a view showing the welding of a bolt.

In the above embodiments, the present invention has been described with respect to an application for welding the nut N. However, as shown in FIG. 10, the present invention is also applicable to the welding of a bolt B in the same manner as with the welding of the nut N.

INDUSTRIAL APPLICABILITY

As described above, in the device for welding a nut or the like according to the present invention, the coupling rod which is vertically movable in the double-tube electrode holder with the cooling water passage defined therein is guided by the guide ring, and the position of the positioning pin disposed on the upper portion of the coupling rod is detected by the detector and controlled. Therefore, the coupling rod is prevented from being tilted when it is vertically moved, allowing the positioning pin to be detected with accuracy. As a result, the device offers combined advantages in that the lower electrode is prevented from being worn by a cooling effect and the positioning accuracy is increased by the detector.

Since the air passage means is provided for passing air through the coupling rod, air can flow smoothly for effectively preventing sputtering particles from entering into the electrode holder.

If the electrode holder and the air cylinder are coupled to each other by the coupling block of magnetic material, and an insulation is provided between the electrode holder and the air cylinder with the magnetoresistance sensor provided on the air cylinder, then the stroke of the air cylinder can be detected accurately without being adversely influenced by an external magnetic field, for thereby substantially fully detecting a failure of the nut or the like and making the device compact. Furthermore, the air cylinder and the cylinder rod are prevented from being electrolytically corroded.

If the electrode holder and the air cylinder are connected to each other by the coupling shaft with the magnetoresistance sensor provided on the air cylinder, then the adverse influences of the external magnetic field can reliably be avoided simply by adjusting the length of the coupling shaft.

The adverse influences of the external magnetic field can further be suppressed by covering the cylinder rod with the magnetic graduations formed thereon, the magnetic detecting element, and the amplifier with the magnetic member for thereby magnetically shielding them.

If the magnetic member and the coupling block, or the coupling shaft is disposed such that the magnetic flux density in the vicinity of the magnetic graduations on the cylinder rod, the magnetic detecting element, and the amplifier is suppressed to 500 gausses or less, then the stroke of the cylinder rod can be detected more accurately for detecting a failure of the nut or the like accurately.

If the coupling rod is coupled to the tip end of the cylinder rod of the air cylinder by an insulating member, then the cylinder rod is prevented from being electrolytically corroded for increased durability.

If the entrance of foreign material preventing means for preventing the entrance of foreign matter, a liquid, etc. from outside the device is disposed around the cylinder rod with the magnetic graduations formed thereon, the magnetic detecting element, and the amplifier, then the accuracy with which to detect the stroke with the magnetic detecting element is not impaired by foreign matter, etc., and the durability of these components is increased.

If foreign matter, a liquid, etc. which have entered into the coupling block are removed by the air blowing mechanism, then the sliding parts are prevented from being worn and the magnetic detecting element is prevented from malfunctioning.

An increased choice is made available of positioning pins by mounting the pin coupling with a variable coupling structure on the upper end of the coupling rod.

What is claimed is:

1. A device for welding, comprising:
   a tubular electrode holder,
   a lower electrode coupled to an upper end of the electrode holder and having a though hole defined centrally therein,
   an air cylinder coupled to a lower end of said electrode holder by a coupling block,
   a coupling rod disposed in a tube of said electrode holder and vertically movable when said air cylinder is operated,
   a positioning pin disposed on an upper portion of the coupling rod and having a tip end movable into and out of the through hole in said lower electrode when the coupling rod is vertically moved,
   an air blowing mechanism adapted to deliver air into an upper portion of the tube from a lower portion of said electrode holder,
   wherein said coupling block comprises a magnetic member, an insulation is provided between the electrode holder and the air cylinder,
   wherein said air cylinder has a cylinder rod with magnetic graduations, and said air cylinder has a magnetic detecting element adapted to detect said magnetic graduations and an amplifier adapted to amplify a signal from said magnetic detecting elements,
   wherein a magnetic shielding member covers and magnetically shields the cylinder rod with the magnetic graduations, the magnetic detecting element, and the amplifier, and
   wherein said magnetic member and said coupling block, or said coupling shaft is disposed such that the magnetic flux density in the vicinity of the magnetic graduations on the cylinder rod, the magnetic detecting element, and the amplifier is suppressed to 500 gauss or less.

2. A device for welding, comprising:

a tubular electrode holder, a lower electrode coupled to an upper end of the electrode holder and having a through hole defined centrally therein, an air cylinder coupled to a lower end of said electrode holder by a coupling shaft, a coupling rod disposed in a tube of said electrode holder and vertically movable when said air cylinder is operated, a positioning pin disposed on an upper portion of the coupling rod and having a tip end movable into and out of the through hole in said lower electrode when the coupling rod is vertically moved, an air blowing mechanism adapted to deliver air into an upper portion of the tube from a lower portion of said electrode holder, an insulation is provided between the electrode holder and the air cylinder, wherein said air cylinder has a cylinder rod with magnetic graduations, and said air cylinder has a magnetic detecting element adapted to detect said magnetic graduations and an amplifier adapted to amplify a signal from said magnetic detecting elements, wherein a magnetic shield covers the cylinder rod with the magnetic graduations, the magnetic detecting element, and the amplifier, and wherein said magnetic shield is adapted to hold magnetic flux density in the vicinity of the magnetic graduations on the cylinder rod, the magnetic detecting element, and the amplifier to about 500 gauss or less.

3. The device for welding according to claim 1, wherein said coupling rod is coupled to the tip end of the cylinder rod of said air cylinder by an insulating member.

4. The device for welding according to claim 1, wherein entrance of foreign material preventing means for preventing the entrance of foreign matter from outside the device is disposed around the cylinder rod with the magnetic graduations formed thereon, the magnetic detecting element, and the amplifier.

5. The device for welding according to claim 1, wherein an in-block air blowing mechanism is provided in said coupling block for removing foreign matter, which have entered into the coupling block with an air blow.

6. The device for welding according to claim 1, wherein an insulator couples said coupling rod to the tip end of the cylinder rod of said air cylinder.

7. The device for welding according to claim 2, wherein an insulator couples said coupling rod to the tip end of the cylinder rod of said air cylinder.

8. The device for welding according to claim 2, wherein a seal is disposed around the cylinder rod with the magnetic graduations formed thereon, the magnetic detecting element, and the amplifier, the seal being adapted to prevent entrance of foreign material.

9. The device of claim 8, wherein the seal is a liquid seal.

10. The device for welding according to claim 2, wherein an in-block air blowing mechanism is provided in said coupling block for removing foreign matter.

11. The device for welding according to claim 1, wherein a pin coupling having a variable coupling structure is disposed on an upper end of said coupling rod for coupling different positioning pins of different coupling types.

12. The device for welding according to claim 2, wherein a pin coupling having a variable coupling structure is disposed on an upper end of said coupling rod for coupling different positioning pins of different coupling types.

13. The device for welding of claim 1, wherein said cylinder rod has a stroke that is detected in an accuracy range from 0.5 to 0.01 +/− about 0.02 mm.

14. The device for welding of claim 1, wherein said cylinder rod has a stroke that is detected in an accuracy range from 0.5 to 0.01 +/− about 0.02 mm.

15. The device of claim 1, wherein the electrode holder includes an inner tube and an outer tube which are fitted together with a cooling water passage defined in a gap therebetween, and wherein the electrode holder further includes a guide ring adapted to guide the coupling rod for vertical movement, the guide ring being positioned on an upper portion of the inner tube.

16. The device of claim 15, wherein the coupling rod includes an air passage operatively connected to the air blowing mechanism.

17. The device of claim 2, wherein the electrode holder includes an inner tube and an outer tube which are fitted together with a cooling water passage defined in a gap therebetween; and wherein the electrode holder further includes a guide ring adapted to guide the coupling rod for vertical movement, the guide ring being positioned on an upper portion of the inner tube.

18. The device of claim 17, wherein the coupling rod includes an air passage operatively connected to the air blowing mechanism.

19. A device for welding, comprising:

a tubular electrode holder, a lower electrode coupled to an upper end of the electrode holder and having a through hole defined centrally therein, an air cylinder coupled to a lower end of said electrode holder by a coupling block, a coupling rod disposed in a tube of said electrode holder and vertically movable when said air cylinder is operated, a positioning pin disposed on an upper portion of the coupling rod and having a tip end movable into and out of the through hole in said lower electrode when the coupling rod is vertically moved, an air blowing mechanism adapted to deliver air into an upper portion of the tube from a lower portion of said electrode holder, wherein said air cylinder has a cylinder rod with magnetic graduations, and said air cylinder has a magnetic detecting element adapted to detect said magnetic graduations and an amplifier adapted to amplify a signal from said magnetic detecting element; and means for suppressing magnetic flux density to about 500 gauss or less in the vicinity of the magnetic graduations on the cylinder rod, the magnetic detecting element, and the amplifier.

20. The device for welding of claim 19, wherein the stroke of said cylinder rod is detected in an accuracy range from 0.5 to 0.01+/−0.02 mm.

21. The device for welding according to claim 19, wherein a pin coupling having a variable coupling structure is disposed on an upper end of said coupling rod for coupling different positioning pins of different coupling types.

22. The device of claim 19, wherein the electrode holder includes a seal adapted to prevent entrance of foreign material from the magnetic detecting element.

23. The device of claim 19, wherein the electrode holder includes a seal adapted to prevent entrance of foreign material from the magnetic graduations of the cylinder rod.

* * * * *